United States Patent
Erickson et al.

(10) Patent No.: US 11,646,015 B1
(45) Date of Patent: *May 9, 2023

(54) PROVIDING AN AUTOMATED SUMMARY

(71) Applicant: United Services Automobile Association (USAA), San Antonio, TX (US)

(72) Inventors: Karl Erickson, San Antonio, TX (US); David James Karle, San Antonio, TX (US); Elizabeth Ann Guerrero, San Antonio, TX (US); Andrew Hunter Davisson, San Antonio, TX (US); Chelsea-Nicole Verzosa Mojica, San Antonio, TX (US); Kinkel Rowan, San Antonio, TX (US); Alexandria Yvonne Carlton, San Antonio, TX (US); Christie Morales Ramirez, Devine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/374,588

(22) Filed: Jul. 13, 2021

Related U.S. Application Data

(63) Continuation of application No. 16/653,403, filed on Oct. 15, 2019, now Pat. No. 11,094,318.

(60) Provisional application No. 62/745,566, filed on Oct. 15, 2018.

(51) Int. Cl.
*G10L 15/18* (2013.01)
*G10L 15/22* (2006.01)
*G06F 40/30* (2020.01)
*G06N 20/00* (2019.01)
*G10L 15/06* (2013.01)

(52) U.S. Cl.
CPC .......... *G10L 15/1815* (2013.01); *G06F 40/30* (2020.01); *G06N 20/00* (2019.01); *G10L 15/063* (2013.01); *G10L 15/22* (2013.01); *G10L 2015/0638* (2013.01)

(58) Field of Classification Search
CPC ... G10L 15/063; G10L 15/1815; G10L 15/22; G10L 2015/0638; G06F 40/30; G06N 20/00
See application file for complete search history.

(56) References Cited

U.S. PATENT DOCUMENTS

| | | |
|---|---|---|
| 7,668,789 B1 | 2/2010 | Forman et al. |
| 8,285,697 B1 | 10/2012 | Truher |
| 8,990,352 B1 * | 3/2015 | Kosslyn .................. H04L 67/60 709/219 |
| 9,652,113 B1 | 5/2017 | Colson et al. |

(Continued)

*Primary Examiner* — Eric Yen
(74) *Attorney, Agent, or Firm* — Fish & Richardson P.C.

(57) ABSTRACT

Methods, systems, and apparatus, including computer programs encoded on computer storage media for summarizing a call. One of the methods includes generating text corresponding to processing audio produced during an interaction between two participants by executing natural language processing logic. The method includes identifying one or more topics by providing the generated text to a machine learning system, the machine learning system trained to identify topics based on text. The method also includes generating a summary of the interaction based on the one or more topics and the text.

18 Claims, 6 Drawing Sheets

(56) References Cited

U.S. PATENT DOCUMENTS

| | | | |
|---|---|---|---|
| 9,715,495 B1* | 7/2017 | Tacchi | G06F 40/30 |
| 9,754,206 B1 | 9/2017 | Brestoff | |
| 10,581,789 B2* | 3/2020 | Jobanputra | H04L 51/226 |
| 10,803,399 B1 | 10/2020 | Cohen et al. | |
| 10,853,580 B1 | 12/2020 | Amrite et al. | |
| 2003/0122874 A1* | 7/2003 | Dieberger | G06F 16/904 |
| | | | 715/764 |
| 2004/0044516 A1* | 3/2004 | Kennewick | G10L 15/1822 |
| | | | 704/E15.04 |
| 2006/0184366 A1* | 8/2006 | Hidaka | G10L 25/00 |
| | | | 704/E11.001 |
| 2009/0306979 A1* | 12/2009 | Jaiswal | G10L 15/063 |
| | | | 704/235 |
| 2014/0207457 A1 | 7/2014 | Biatov et al. | |
| 2015/0082156 A1 | 3/2015 | Rollins et al. | |
| 2015/0254555 A1 | 9/2015 | Williams, Jr. et al. | |
| 2016/0026932 A1 | 1/2016 | Li et al. | |
| 2017/0372630 A1 | 12/2017 | Janes et al. | |
| 2018/0285461 A1 | 10/2018 | Smith et al. | |
| 2018/0359530 A1 | 12/2018 | Marlow et al. | |
| 2019/0042551 A1* | 2/2019 | Hwang | G06N 3/0454 |
| 2019/0043506 A1 | 2/2019 | Rivkin et al. | |
| 2019/0114298 A1* | 4/2019 | Acharya | G06F 40/20 |
| 2019/0124202 A1 | 4/2019 | Dubey et al. | |
| 2019/0130073 A1 | 5/2019 | Sun et al. | |
| 2019/0205395 A1 | 7/2019 | Bonin et al. | |
| 2019/0243916 A1 | 8/2019 | Ashoori et al. | |
| 2019/0325329 A1* | 10/2019 | Rais-Ghasem | G06F 16/325 |
| 2019/0378428 A1 | 12/2019 | Nevarez et al. | |
| 2020/0076746 A1 | 3/2020 | Penrose et al. | |
| 2020/0175106 A1 | 6/2020 | Biddle et al. | |
| 2020/0250489 A1 | 8/2020 | Zhou et al. | |
| 2020/0293553 A1 | 9/2020 | Sonobe et al. | |

* cited by examiner

PROVIDING AN AUTOMATED SUMMARY

CROSS-REFERENCE TO RELATED APPLICATIONS

This application is a continuation application of and claims priority under 35 U.S.C. § 120 to U.S. application Ser. No. 16/653,403, filed on Oct. 15, 2019, which claims priority under 35 U.S.C. § 119 to U.S. Application Ser. No. 62/745,566, filed on Oct. 15, 2018, the entire contents of each of which are incorporated by reference herein.

BACKGROUND

Natural language processing (NLP) is an area of computer science and artificial intelligence concerned with the interactions between computer and human (natural) languages, in particular how to program computers to process and analyze large amounts of natural language data.

SUMMARY

In general, one innovative aspect of the subject matter described in this specification can be embodied in methods that include the act of generating text corresponding to processing audio produced during an interaction between two participants using natural language processing. The methods include the act of generating one or more topics by providing the generated text to a machine learning system, the machine learning system trained to identify topics based on the text. The methods also include the act of generating a summary of the conversation based on the one or more topics and the text.

Other embodiments of this aspect include corresponding data processing systems, apparatus, and computer programs recorded on one or more computer storage devices, each configured to perform the actions of the methods. A system of one or more data processing systems can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the acts of providing a topic of the plurality of topics to one participate, receiving a confirmation that the topic is appropriate, and providing the text and the topic as a positive test case to a machine learning trainer. The methods may include the act of providing a topic of the plurality of topics to one participate, receiving an indication that the topic is not appropriate, and providing the text and the topic as a negative test case to a machine learning trainer. The methods may include the act of causing the summary to be presented on a mobile device of one of the participants. The methods may include the act of updating the summary based on additional information. Generating the topics may be further based on an action by at least one of the participants.

BRIEF DESCRIPTION OF THE DRAWINGS

Like reference numbers and designations in the various drawings indicate like elements.

DETAILED DESCRIPTION

Human memory can be relatively fragile and prone to error. Studies have shown that some people's memories are remarkably fluid, especially during periods of high stress. Thus, many details that a person is told can be readily lost in the face of more urgent issues that demand a person's attention.

Figure 1:
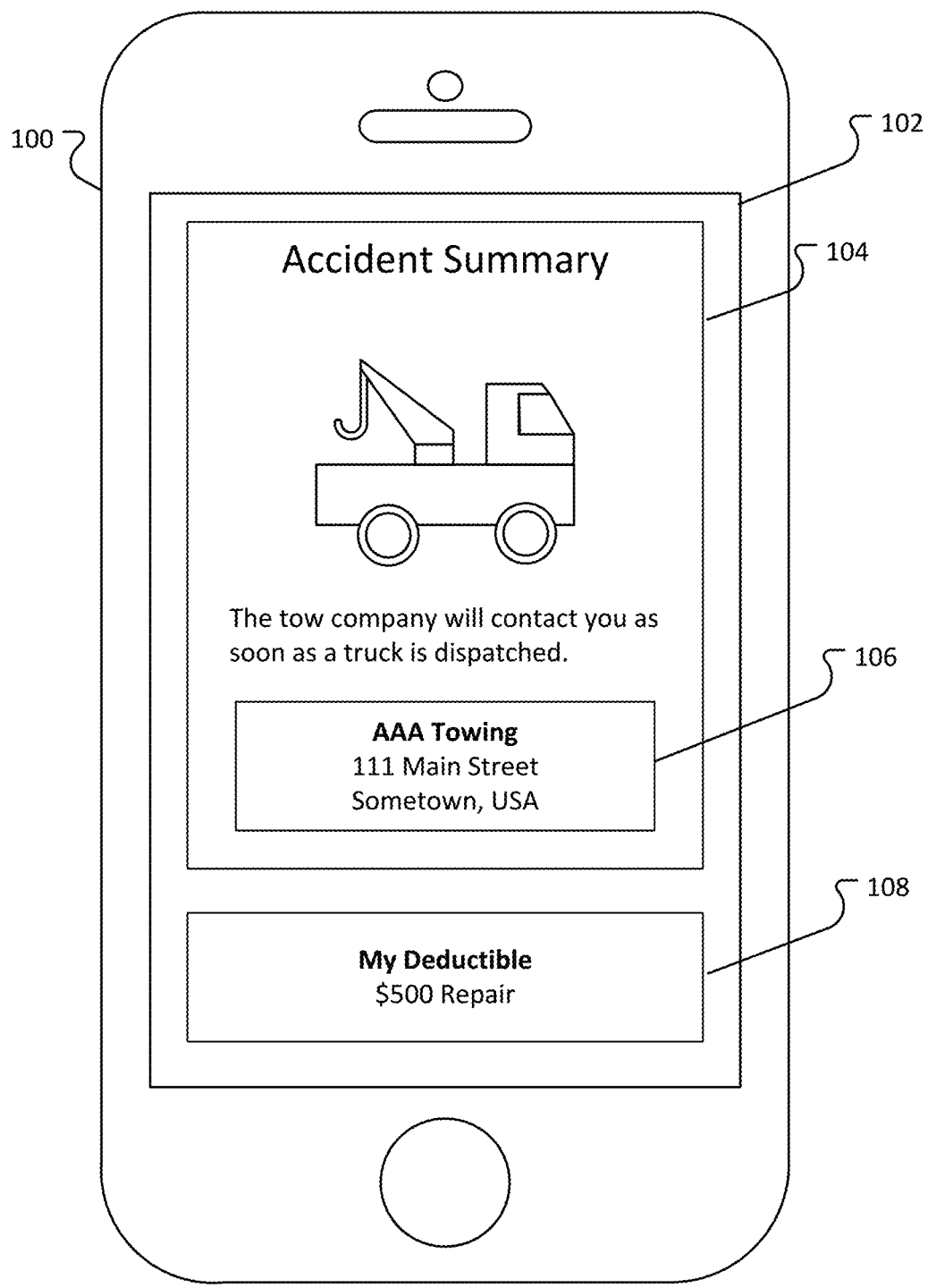
FIG. 1 illustrates an example user interface 102 on a mobile device 100 summarizing a portion of a conversation.

It can be beneficial to record notes and additional information that summarizes a conversation. For example, FIG. 1 illustrates an example user interface 102 on a mobile device 100 summarizing a portion of a conversation. While the illustrated implementation includes a summary 104 presented on a mobile device 100, the summary 104 can be presented on any computational device capable of receiving and presenting the summary 104 to a user.

In the illustrated example, the summary 104 provides details about a towing arrangement. The summary 104 includes one or more graphical representations 106 indicating the contact information of the towing company. The user interface 102 includes a complete report, which includes the summary 104 and one or more graphical representations 108 that represents additional information, such as deductible information 108, information about damage to a vehicle, information about any injuries that have occurred, images associated with the accident, and a description of the accident report itself, among other information.

Summarizing a conversation can be difficult. Discussions do not always take place according to a script. While similar things can be discussed under similar circumstances, each conversation can present information in a different order, or can place more emphasis on a particular part of the conversation, or, to some extent, convey more or less information. For example, a customer reporting an auto accident to his insurance carrier can generally convey the same information as other customers reporting other accidents; however, depending on the circumstances, emotional state of the customer, and other factors, the conversation can be very different.

In general, the summary information can be divided into a series of topics. Each topic can correspond to a different portion of the conversation. For example, one topic can relate to vehicle damage, while another topic can relate to road conditions, and still another topic can include information about other parties in the accident.

A computer system using natural language processing and machine learning technologies can be developed to "listen" to a conversation between two or more participants (for example, a customer and a customer service representative) and can identify the topics that are discussed during the conversation. Once the conversation is complete, a summary of the topics can be provided to one or more of the participants. In some implementations, the computer system can organize the topics discussed into a more logical organization.

Generally, machine learning can encompass a wide variety of different techniques that are used to train a machine to perform specific tasks without being specifically programmed to perform those tasks. The machine can be trained using different machine learning techniques, including, for example, supervised learning, unsupervised learning, and reinforcement learning. In supervised learning, inputs and corresponding outputs of interest are provided to the machine. The machine adjusts its functions to provide the desired output when the inputs are provided. Supervised learning is generally used to teach a computer to solve problems in which are outcome determinative. In contrast, in unsupervised learning inputs are provided without providing a corresponding desired output. Unsupervised learning is generally used in classification problems such as, customer segmentation. Reinforcement learning describes an algorithm which a machine makes decisions using trial and error. Feedback informs the machine when a good choice or bad choice is made. The machine then adjusts its algorithms accordingly.

During the training process, different algorithms can be used, including among others, generalized linear regression (GLM). A Poisson GLM is an algorithm used to model discrete counts based on independent inputs.

For example, the trained learning model can be embodied as an artificial neural network. Artificial neural networks (ANNs) or connectionist systems are computing systems inspired by the biological neural networks that constitute animal brains. An ANN is based on a collection of connected units or nodes, called artificial. Each connection, like the synapses in a biological brain, can transmit a signal from one artificial neuron to another. An artificial neuron that receives a signal can process it and then signal additional artificial neurons connected to it.

In common ANN implementations, the signal at a connection between artificial neurons is a real number, and the output of each artificial neuron is computed by some non-linear function of the sum of its inputs. The connections between artificial neurons are called 'edges.' Artificial neurons and edges can have a weight that adjusts as learning proceeds (for example, each input to an artificial neuron can be separately weighted). The weight increases or decreases the strength of the signal at a connection. Artificial neurons can have a threshold such that the signal is only sent if the aggregate signal crosses that threshold. The transfer functions along the edges usually have a sigmoid shape, but they can also take the form of other non-linear functions, piecewise linear functions, or step functions. Typically, artificial neurons are aggregated into layers. Different layers can perform different kinds of transformations on their inputs. Signals travel from the first layer (the input layer) to the last layer (the output layer), possibly after traversing the layers multiple times.

Figure 2:
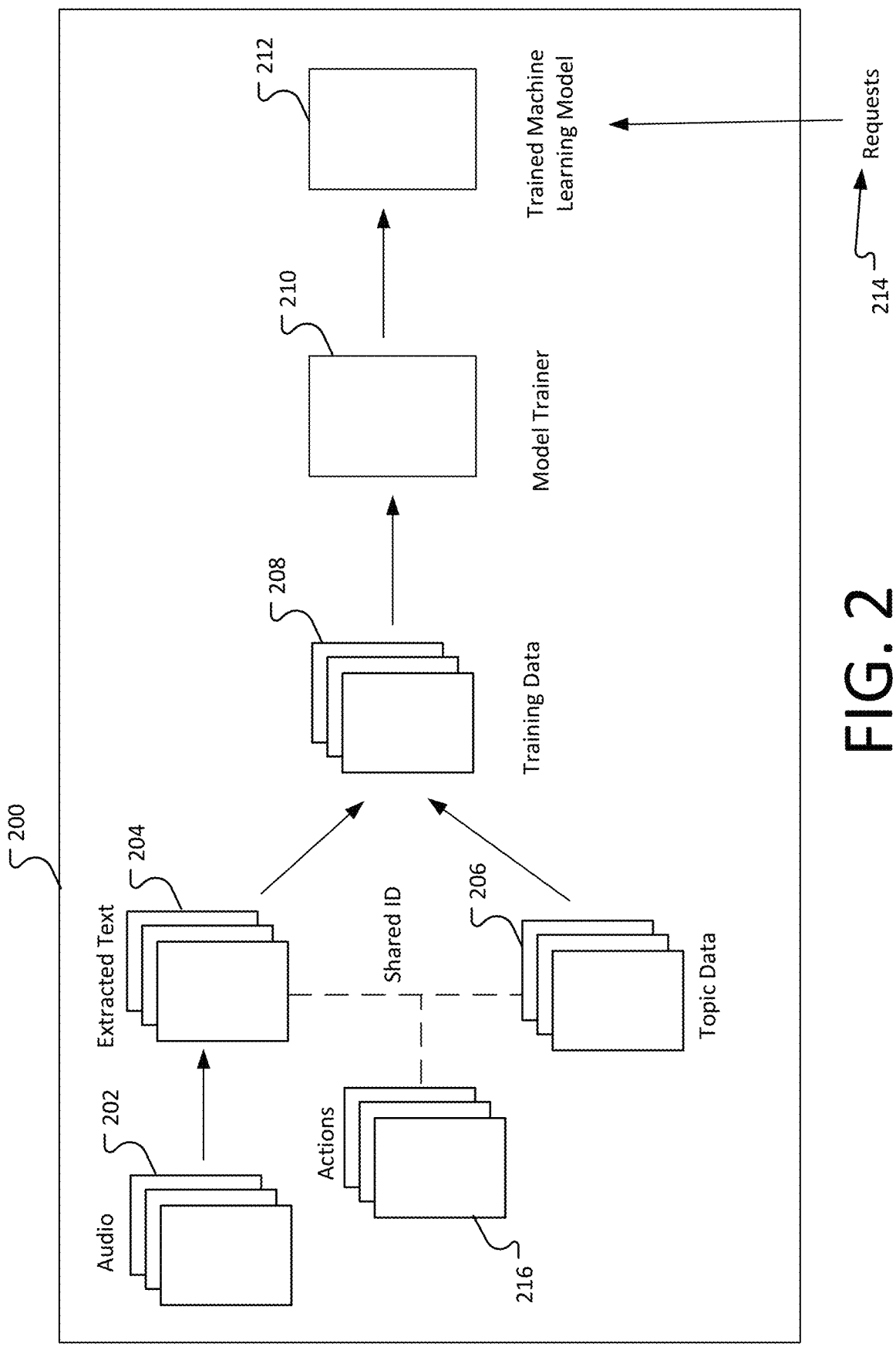
FIG. 2 illustrates an example of training a machine learning model to determine topics of conversation.

In another example, the trained learning model can be embodied as a generalized linear model. Different types of generalized linear models can be appropriate in various scenarios. A zero-inflated negative binomial GLM (zNBGLM) was used because it models a discrete count of events occurring in a given period, by estimating the per-patient hypoglycemic event rates most likely to have resulted in the hypoglycemic counts seen in the data. One downside of a zNBGLM is that the model allows for very many degrees of freedom and tended to over-fit the data for smaller segments, thus degrading generalization performance. Another type of generalized linear model is a Poisson GLM. A Poisson GLM is well suited to modeling discrete counts but does not allow for 'over-dispersion' (i.e., it constrains the variance to be equal to the mean). The Poisson GLM used the number of hypoglycemic events as the target variable (outcome) and the length of observation as an offset variable FIG. 2 illustrates an example architecture 200 for training a machine learning model to determine topics of conversation. The machine-learning model can be trained using data from historical conversations. In some implementations, the data from the historical conversations includes audio data 202, which can be audio recordings that are collected over a period of time. Natural language processing techniques can be used to extract text data 204 from the audio recording. The extracted text 204 can represent an entire conversation or a portion of the conversation. For example, the audio data 202 can be segmented based on the topic discussed.

The extracted text data 204 can be combined with topic data 206. In general, the topic data 206 for a piece of extracted text 204 can identify the topic identified in the extracted text data 204. In some implementations, during an initial training stage, the extracted text data 204 can be manually matched with topic data 206. For example, an individual or individuals can review the extracted text data 204 and assign a topic to each portion of the extracted text data 204. The assigned topic can be used to assign the topic data 206. For example, one topic can be "towing information" and the topic data associated with it can be, for example, a number or other identifiers that the computer system associates with towing information. Alternatively, in some implementations, the topic data 206 can include the phrase "towing information." In some implementations, positive and negative feedback can be provided to refine the training data 208 and the resulting machine learning system 212, as described further below.

The extracted text 204 and corresponding topic data 206 can be combined to form training data 208. The training data 208 can include one or more training records and each training record can identify the extracted text as input and the topic data as the desired output.

In some implementations, the training data 208 includes actions 216 that may be taken by one of the parties that are indicative of a topic. For example, a customer service representative may be accessing parts of an application or recording information in particular system locations. Such information can be included in the training data 208.

The training data 208 can be provided to a model trainer 210; the model trainer 210 can use the training data 208 to generate a trained machine learning model 212. The trained machine-learning model 212 can then accept requests 214, which can include extracted text from a phone conversation. The trained machine-learning model 212 can identify topics associated with the extracted text.

Figure 3:
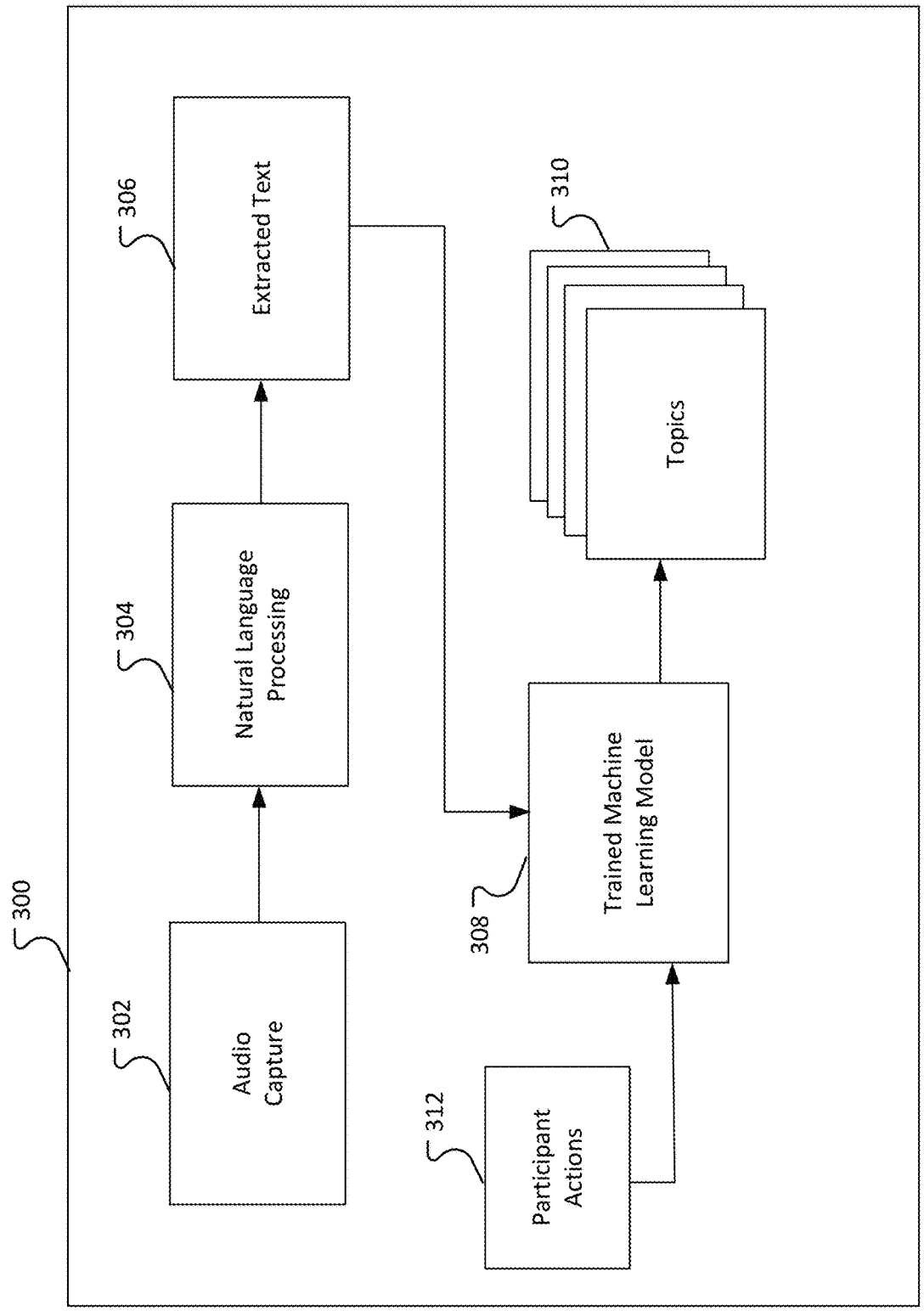
FIG. 3 illustrates a sample system 300 for identifying topics using the trained machine-learning model.

FIG. 3 illustrates a sample system 300 for identifying topics using the trained machine-learning model. The system 300 may include an audio capture system 302. The audio capture system 302 captures audio during a conversation between two individuals (for example, a customer service representative and a customer.) The audio capture system 302 may be part of an automated system that automatically records conversations.

The system 300 can also include a natural language processing system 304. The natural language processing system 304 analyzes an audio recording captured by the audio capture system 300 and generates text based at least partially on the analysis. The texts can be, for example, text that corresponds to the words spoken between two individuals. As described above, the system 300 can use information from one of the participants in the conversation. For example, in a customer service application, the interactions 312 of the customer service representative with the computer systems may also provide input into the trained machine-learning system.

The system 300 provides the extracted text to a trained machine-learning model 308. The trained machine-learning model 308 generates one or more topics that are likely to be associated with the extracted text. In some implementations, each topic may be associated with a score that indicates the likelihood that the extracted text relates to the identified topic.

Figure 4:
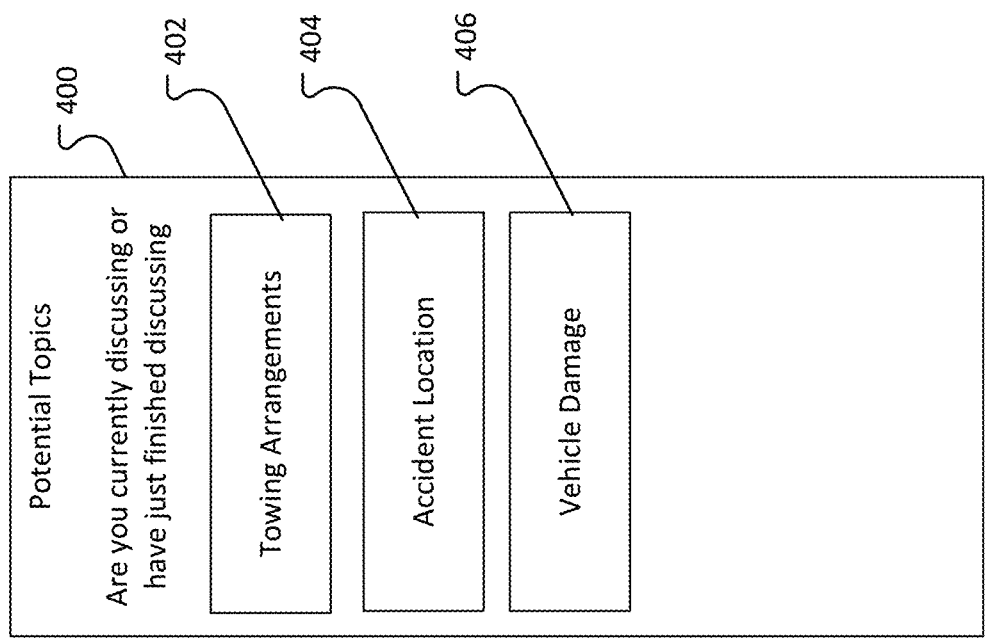
FIG. 4 illustrates an example user interface 400 displaying potential topics of discussion to one of the participants in the conversation.

FIG. 4 illustrates an example user interface 400 displaying potential topics of discussion to one of the participants in the conversation. The user interface 400 can be provided as part of another user interface, for example, the user interface 400 may be a component that can be inserted into another user interface or may include widgets that can be replicated in another user interface.

In this example, the user interface 400 may include a list of topics. The list may be ordered based on the most likely topic to least likely topic. In some implementations, topics that have a score, as discussed above, below a threshold value may not be included in the list. In some implementations, only a predetermined number of topics are presented (for example, no more than three). Here, the user interface 400 presents three topics: towing arrangement 402, accident location 404, and vehicle damage 406.

The user of the user interface 400 may select the topic that is appropriate to the conversation. Selecting the topic can have one or more effects. In some implementations, selecting the topic definitively provides the topic to include in the summary of the conversation. In some implementations, the extracted text and the selected topic can be used to refine the trained machine-learning model.

Figure 5:
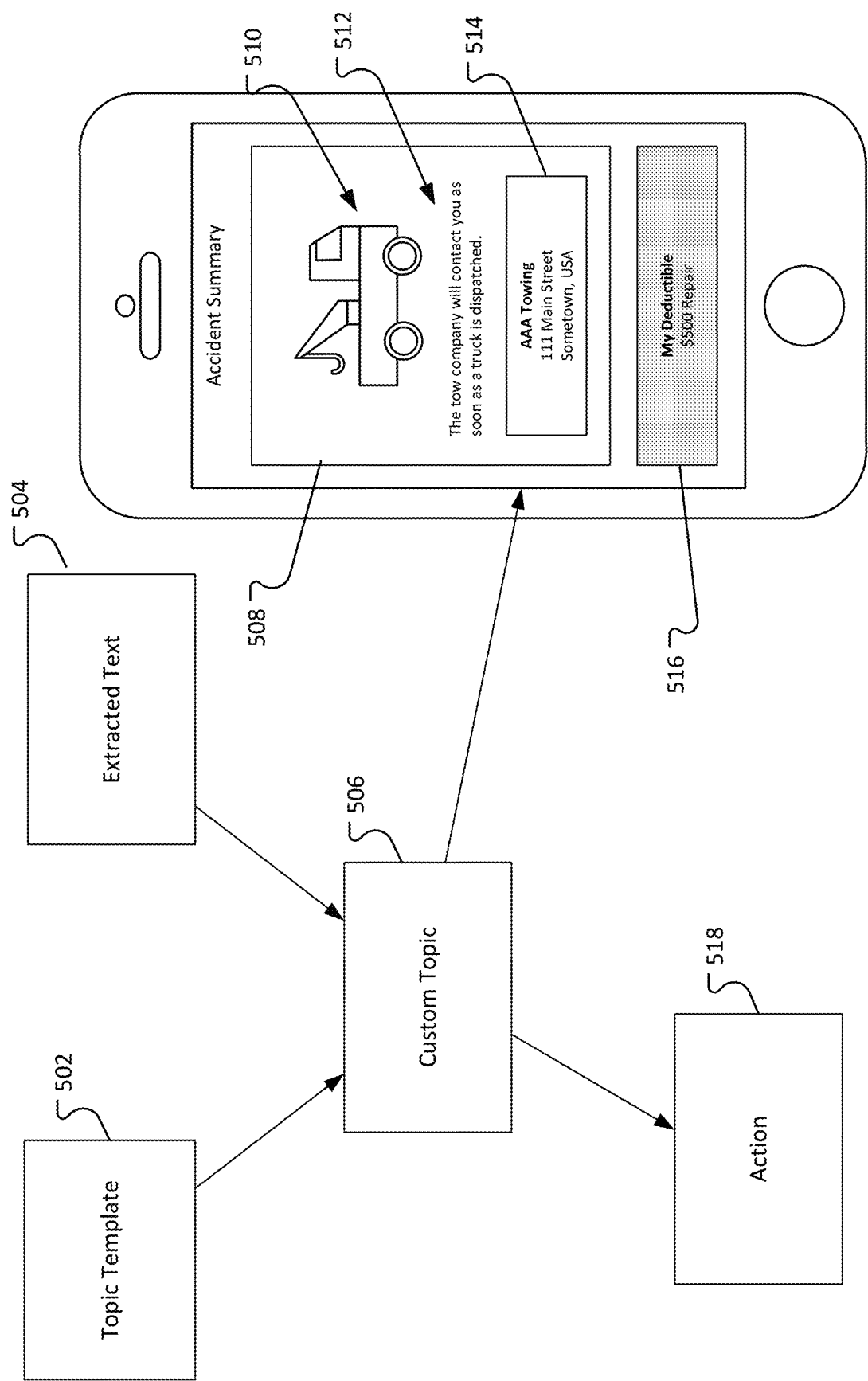
FIG. 5 illustrates generating a portion of a conversation summary and displaying it on a user interface.

FIG. 5 illustrates generating a portion of a conversation summary and displaying it on a user interface. In some implementations, a topic included in the summary 508 (for example, the topic identified based on extracted text 504) may include both standard text in a template 502 and text from the extracted text 504.

For example, the topic may be associated with the towing topic includes the tow truck image 510, standard text 512, and text extracted from the conversation 514. In some implementations, the extracted text may be used to generate custom text. For example, the customer service representative may say "AAA Towing should be there shortly," the system may identify AAA Towing as a towing company and may look up the address.

In some implementations, the identified customer topic 506 may be associated with an action 518. For example, the action may include contacting and dispatching a tow truck to the customer's location. The actions may be created on behalf of either participant in the conversation (for example, a customer and a customer service representative). In some implementations, the natural language processing can create the topic and send it to the customer and also create an assignment on the backend. The action may include providing select information documents (for example, claims information in case of an insurance claim).

In some implementation, information about the conversation summary may be shared with one or more of the participants in real-time. For example, a customer may receive a summary of the conversation while the conversation is taking place. In some implementations, the conversation summary information may be automatically shared with the customer. In some implementations, the conversation summary topics are approved by a customer service representative before they are shared with the customer. As discussed above, each topic may be associated with a score assigned by the machine learning system. In some implementations, topics where the score of the topic exceeds a threshold are shared with the customer automatically, topics where the score is below the threshold are presented to the customer service representative for approval.

Participants in the conversation may opt-in to receiving the summary. For example, a customer may be presented with an option to receive the real-time summary.

The conversation summary system can be used in multiple different environments and may act as an auxiliary system to other systems. For example, the conversation summary system can be used in conjunction with a financial planning system, technical support, sales negotiations, or any other time when the ability to recall what was discussed during a conversation would be helpful.

In some implementations, a summary can be updated by events occurring after the conversation. For example, the deductible information 516 may be added to the summary after the call completes. In some implementations, added information may be delineated, for example, by using a different color.

Figure 6:
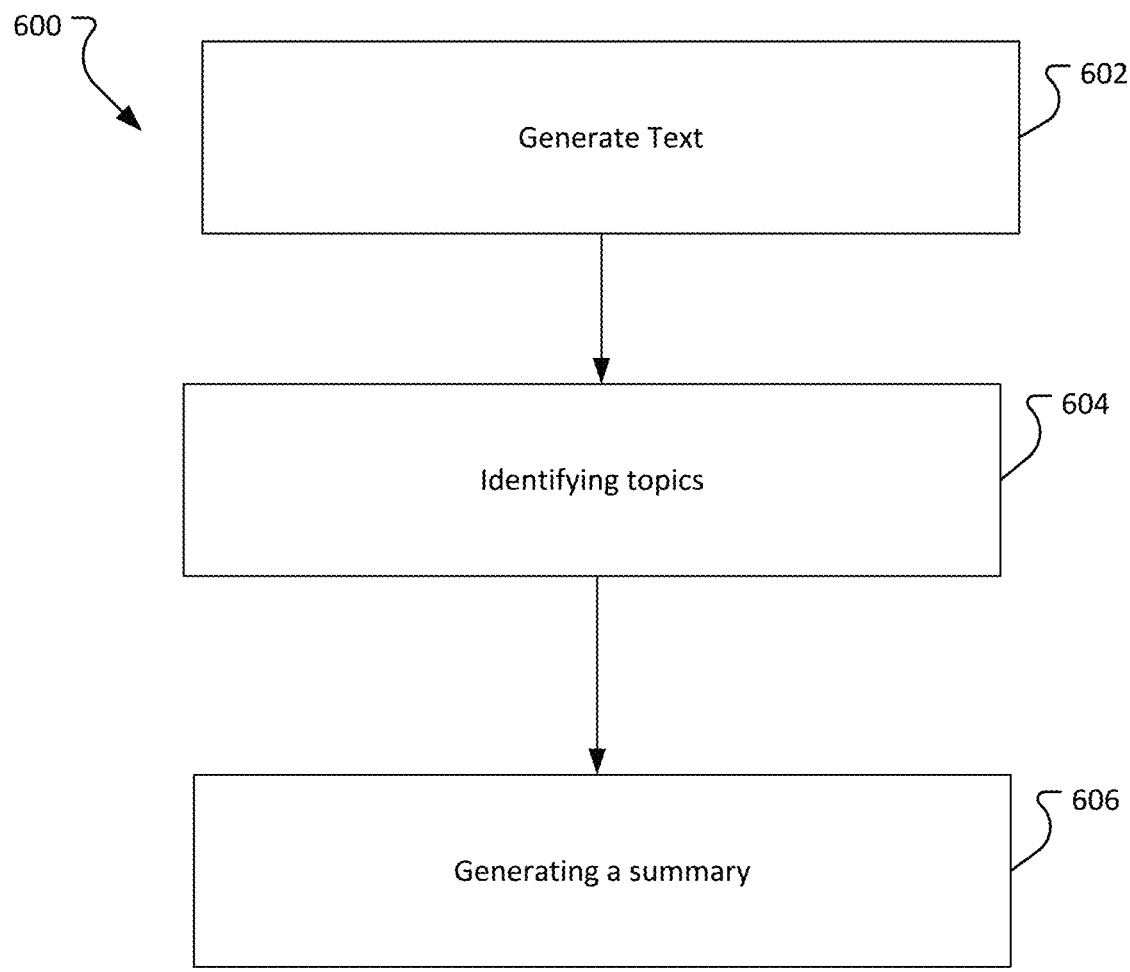
FIG. 6 illustrates an example process for summarizing a telephone call.

FIG. 6 illustrates an example process for summarizing a telephone call. The process may be performed, for example, by a processor executing as part of a computer system.

The process 600 generates 602 text. Generating 602 text can include processing audio data produced during an interaction between two participants by executing natural language processing logic.

The process 600 identifies 604 one or more topics by providing the generated text to a machine learning system. The machine learning system can be trained to identify topics based on text. In some implementations, generating the topics may also be based on an action by at least one of the participants, for example, an interaction with another computer system.

The process 600 generates 606 a summary of the conversation based on the one or more topics and the text.

The process may provide a topic of the plurality of topics to one participant (e.g., user), receiving a confirmation that the topic is appropriate, and providing the text and the topic as a positive test case to a machine learning trainer. The process may provide a topic of the plurality of topics to one participate, receive an indication that the topic is not appropriate, and providing the text and the topic as a negative test case to a machine learning trainer. The process 600 may cause the summary to be presented on a mobile device of one of the participants. The process 600 may update the summary based on additional information.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program can, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data to include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method implemented by one or more data processing systems, comprising:
   identifying, by the one or more data processing systems, one or more topics of text, the text corresponding to audio data produced for a conversation, wherein each of the one or more topics is assigned a respective score that indicates a likelihood that the text relates to the topic;
   generating a summary of the conversation based on the one or more topics and the text; and
   for each of the one or more topics, determining whether the respective score of the topic exceeds a threshold, and in response to a determination that the respective score exceeds the threshold, automatically sending a portion of the summary corresponding to the topic to a computing device of at least one participant of the conversation.

2. The method of claim 1, further comprising:
   providing a topic of the one or more topics to at least one participant of the conversation;
   receiving a confirmation that the provided topic is appropriate; and
   providing the text and the provided topic as a positive test case to a machine learning trainer.

3. The method of claim 1, further comprising:
   providing a topic of the one or more topics to at least one participant of the conversation;
   receiving an indication that the provided topic is not appropriate; and
   providing the text and the provided topic as a negative test case to a machine learning trainer.

4. The method of claim 1, further comprising causing the summary to be presented on a mobile device.

5. The method of claim 1, further comprising updating the summary based on additional information.

6. The method of claim 1, wherein identifying the one or more topics is further based on an action performed by at least one participant.

7. A non-transitory computer readable medium storing instructions that, when executed by one or more processors, cause the one or more processors to perform operations comprising:
   identifying one or more topics of text, the text corresponding to audio data produced for a conversation, wherein each of the one or more topics is assigned a respective score that indicates a likelihood that the text relates to the topic;
   generating a summary of the conversation based on the one or more topics and the text; and
   for each of the one or more topics, determining whether the respective score of the topic exceeds a threshold, and in response to a determination that the respective score exceeds the threshold, automatically sending a portion of the summary corresponding to the topic to a computing device of at least one participant of the conversation.

8. The non-transitory computer readable medium of claim 7, wherein the operations further comprise:
   providing a topic of the one or more topics to at least one participant;
   receiving a confirmation that the provided topic is appropriate; and
   providing the text corresponding to the audio data and the provided topic as a positive test case to a machine learning trainer.

9. The non-transitory computer readable medium of claim 7, wherein the operations further comprise:
   providing a topic of the one or more topics to at least one participant;
   receiving an indication that the provided topic is not appropriate; and
   providing the text and the provided topic as a negative test case to a machine learning trainer.

10. The non-transitory computer readable medium of claim 7, wherein the operations further comprise causing the summary to be presented on a mobile device.

11. The non-transitory computer readable medium of claim 7, wherein the operations further comprise updating the summary based on additional information.

12. The non-transitory computer readable medium of claim 7, wherein identifying the one or more topics is further based on an action by at least one of the participants.

13. A system comprising:
   one or more processors; and
   a data store coupled to the one or more processors having instructions stored thereon which, when executed by the one or more processors, cause the one or more processors to perform operations comprising:
      identifying one or more topics of text, the text corresponding to audio data produced for a conversation, wherein each of the one or more topics is assigned a respective score that indicates a likelihood that the text relates to the topic;
      generating a summary of the conversation based on the one or more topics and the text; and
      for each of the one or more topics, determining whether the respective score of the topic exceeds a threshold, and in response to a determination that the respective score exceeds the threshold, automatically sending a portion of the summary corresponding to the topic to a computing device of at least one participant of the conversation.

14. The system of claim 13, wherein the operations further comprise:
   providing a topic of the one or more topics to at least one participant;
   receiving a confirmation that the provided topic is appropriate; and
   providing the text and the provided topic as a positive test case to a machine learning trainer.

15. The system of claim 13, wherein the operations further comprise:
   providing a topic of the one or more topics to at least one participant;

receiving an indication that the provided topic is not appropriate; and providing the text and the provided topic as a negative test case to a machine learning trainer.

16. The system of claim 13, wherein the operations further comprise causing the summary to be presented on a mobile device.

17. The system of claim 13, wherein the operations further comprise updating the summary based on additional information.

18. The system of claim 13, wherein identifying the one or more topics is further based on an action by at least one participant.

\* \* \* \* \*